United States Patent
Kroes et al.

(10) Patent No.: US 12,184,097 B2
(45) Date of Patent: Dec. 31, 2024

(54) METHODS AND SYSTEMS FOR POWER SHARING AND CHARGING COORDINATION OF SELF-CONTAINED CLIMATE CONTROLLED STORAGE UNIT(S)

(71) Applicant: THERMO KING LLC, Minneapolis, MN (US)

(72) Inventors: Paul J. Kroes, Eden Prairie, MN (US); Ryan Wayne Schumacher, Bloomington, MN (US); Matthew Srnec, Minnetonka, MN (US); Jason Tilghman, Minneapolis, MN (US); Srinivasa Rao Koppineedi, Eagan, MN (US)

(73) Assignee: THERMO KING LLC, Minneapolis, MN (US)

( * ) Notice: Subject to any disclaimer, the term of this patent is extended or adjusted under 35 U.S.C. 154(b) by 223 days.

(21) Appl. No.: 18/056,488

(22) Filed: Nov. 17, 2022

(65) Prior Publication Data
US 2024/0170974 A1     May 23, 2024

(51) Int. Cl.
*H02J 7/00* (2006.01)
*F25D 11/00* (2006.01)
*G06Q 30/0283* (2023.01)

(52) U.S. Cl.
CPC ......... *H02J 7/0013* (2013.01); *F25D 11/003* (2013.01); *G06Q 30/0284* (2013.01);
(Continued)

(58) Field of Classification Search
CPC .... H02J 7/0013; H02J 7/00032; H02J 7/0048; H02J 7/00712; H02J 7/0042; H02J 7/0068; H02J 7/35; H02J 2310/14; H02J 9/06; H02J 3/32; F25D 11/003; G06Q 30/0284; F24F 5/0017; F24F 11/30
See application file for complete search history.

(56) References Cited

U.S. PATENT DOCUMENTS

| | | |
|---|---|---|
| 9,290,104 B2 | 3/2016 | Gadh et al. |
| 10,014,722 B2 | 7/2018 | Kuennen et al. |
| (Continued) | | |

FOREIGN PATENT DOCUMENTS

| | | |
|---|---|---|
| EP | 2768693 | 8/2014 |
| EP | 3790157 | 3/2021 |
| (Continued) | | |

OTHER PUBLICATIONS

Extended European Search Report, issued in the corresponding European patent application No. 23210533.8 dated May 29, 2024, 7 pages.

*Primary Examiner* — Emmanuel E Duke
(74) *Attorney, Agent, or Firm* — HSML P.C.

(57) ABSTRACT

An electrically powered portable self-contained climate controlled storage unit is provided to connect to and automatically share power with an external power source. The storage unit includes a rechargeable battery system and a controller to determine whether to direct power flow to or from the rechargeable battery system. Methods and systems are provided for actively coordinating charging of multiple electrically powered portable self-contained climate controlled storage units that are connected to the external power source.

20 Claims, 10 Drawing Sheets

(52) U.S. Cl.
CPC ........ *H02J 7/00032* (2020.01); *H02J 7/0048* (2020.01); *H02J 7/00712* (2020.01)

(56) References Cited

U.S. PATENT DOCUMENTS

| | | |
|---|---|---|
| 10,110,006 B2 | 10/2018 | Wood et al. |
| 10,538,211 B2 | 1/2020 | Srnec et al. |
| 10,933,825 B2 | 3/2021 | Schumacher et al. |
| 2012/0217933 A1 | 8/2012 | Abe et al. |
| 2018/0152044 A1 | 5/2018 | Srnec et al. |
| 2020/0207185 A1* | 7/2020 | Saroka .................. H01M 10/48 |
| 2024/0067005 A1 | 2/2024 | Javidan et al. |

FOREIGN PATENT DOCUMENTS

| | | | | |
|---|---|---|---|---|
| EP | 3790157 A1 * | 3/2021 | ......... | B60H 1/00428 |
| WO | 2013/056990 | 4/2013 | | |
| WO | WO-2013056990 A2 * | 4/2013 | ............. | B60L 53/14 |
| WO | 2016/196488 | 12/2016 | | |
| WO | WO-2016196488 A1 * | 12/2016 | ......... | B60H 1/00428 |

\* cited by examiner

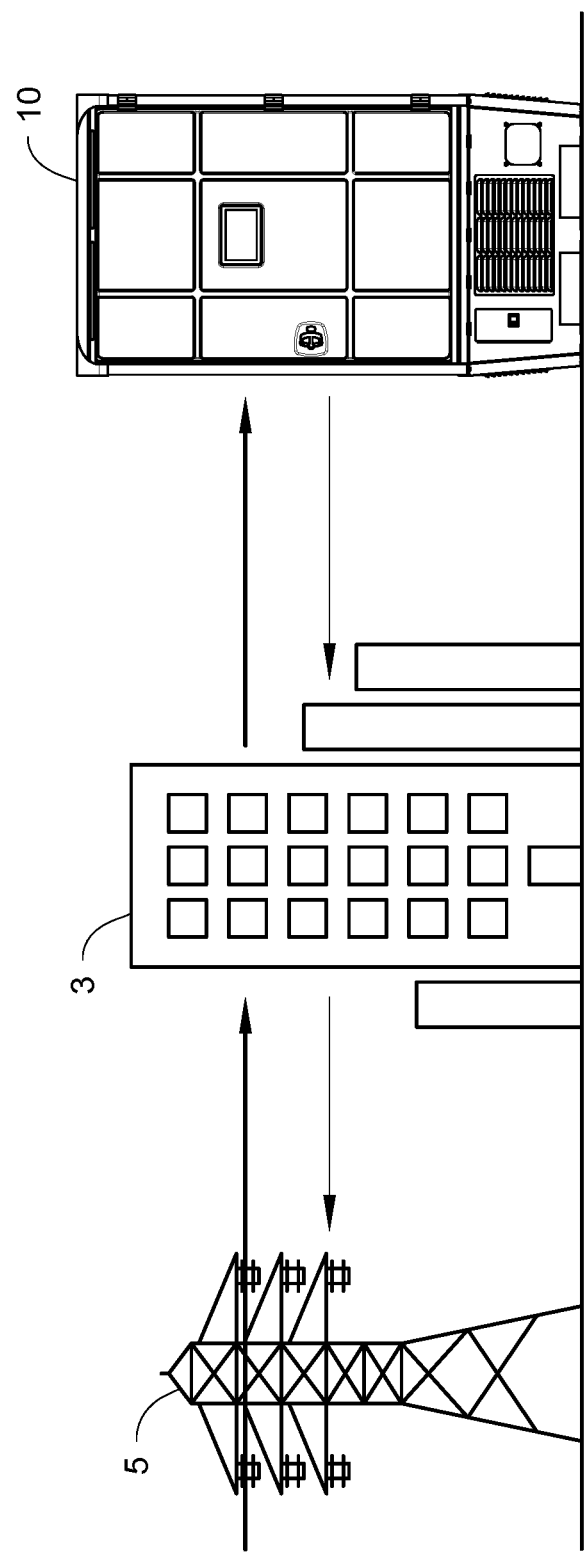

METHODS AND SYSTEMS FOR POWER SHARING AND CHARGING COORDINATION OF SELF-CONTAINED CLIMATE CONTROLLED STORAGE UNIT(S)

FIELD

This disclosure relates generally to a self-contained climate controlled storage unit. More particularly, the disclosure relates to methods and systems for power sharing and charging coordination of self-contained climate controlled storage unit(s).

BACKGROUND

A self-contained climate controlled storage unit, such as a refrigerated air freight container (e.g., Air100-RKN and AIR200-RAP from Thermo King and Envirotainer®, etc.), a portable refrigeration container (e.g., ColdCube™ container from Thermo King, Coldtainer® from Thermo King, etc.), etc., provides portable climate controlled storage for cargo (e.g., produce, frozen foods, pharmaceuticals, etc.). In some instances, the cargo can be high value/critical cargo. Self-contained climate controlled storage units are typically battery powered. The battery typically requires charging prior to transport so that the unit can provide and maintain climate control (e.g., temperature, humidity, pressure, etc.) without relying on external power. In many instances, regulatory agencies (e.g., Federal Aviation Administration—FAA, etc.) and trade associations (e.g., International Air Transport Association—IATA, etc.) provide regulations that impose strict performance specifications on self-contained climate controlled storage units. Failure to meet these regulations can result in refusal of certification and entry into, for example, an aircraft.

SUMMARY

This disclosure relates generally to a self-contained climate controlled storage unit. More particularly, the disclosure relates to methods and systems for power sharing and charging coordination of self-contained climate controlled storage unit(s).

In an embodiment, the present disclosure describes an electrically powered portable self-contained climate controlled storage unit. The storage unit includes a base including an enclosure, a climate controlled space affixed to the base, a climate control system at least partially received in the enclosure, and configured to provide climate control to the climate controlled space, and a power source configured to supply power to the climate control system. The power source includes a rechargeable battery system received in the enclosure. The storage unit further includes a power circuit component connected to the rechargeable battery system. The power circuit component is configured to direct power flow to or from the rechargeable battery system. The storage unit further includes a controller configured to obtain one or more power sharing parameters and configured to determine whether to direct power flow to or from the rechargeable battery system for a predetermined period of time based on one or more power sharing parameters.

In an embodiment, the present disclosure describes a method of coordinating charging of a plurality of electrically powered portable self-contained climate controlled storage units to be connected to an external power source. Each storage unit includes a climate control system configured to provide climate control to an internal climate controlled space. The climate control system includes a power source to supply power to the climate control system. The power source includes a rechargeable battery system. The method includes a controller pairing the plurality of storage units to form a group, the controller communicating to update an individual status for each storage unit among the group, the controller determining a charge priority for each storage unit of the group based on the updated individual status, and the controller instructing to charge, via the external power source, the plurality of storage units based on the determined charge priority.

In another embodiment, the present disclosure describes a coordinated control system including a plurality of electrically powered portable self-contained climate controlled storage units to be connected to an external power source. Each storage unit includes an internal climate controlled space, a climate control system configured to provide climate control to the internal climate controlled space, and a power source configured to supply power to the climate control system. The power source includes a rechargeable battery system. The system further includes a controller configured to pair the plurality of storage units to form a group, communicate to update an individual status for each storage unit among the group, determine a charge priority for each storage unit of the group based on the updated individual status, and instruct to charge, via the external power source, the plurality of storage units of the group based on the determined charge priority.

Various aspects and advantages of exemplary embodiments of the disclosure have been summarized. The above Summary is not intended to describe each illustrated embodiment. Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

FIG. 4 is a schematic diagram of a self-contained climate controlled storage unit connecting to a grid, according to an embodiment.

Figure 1:
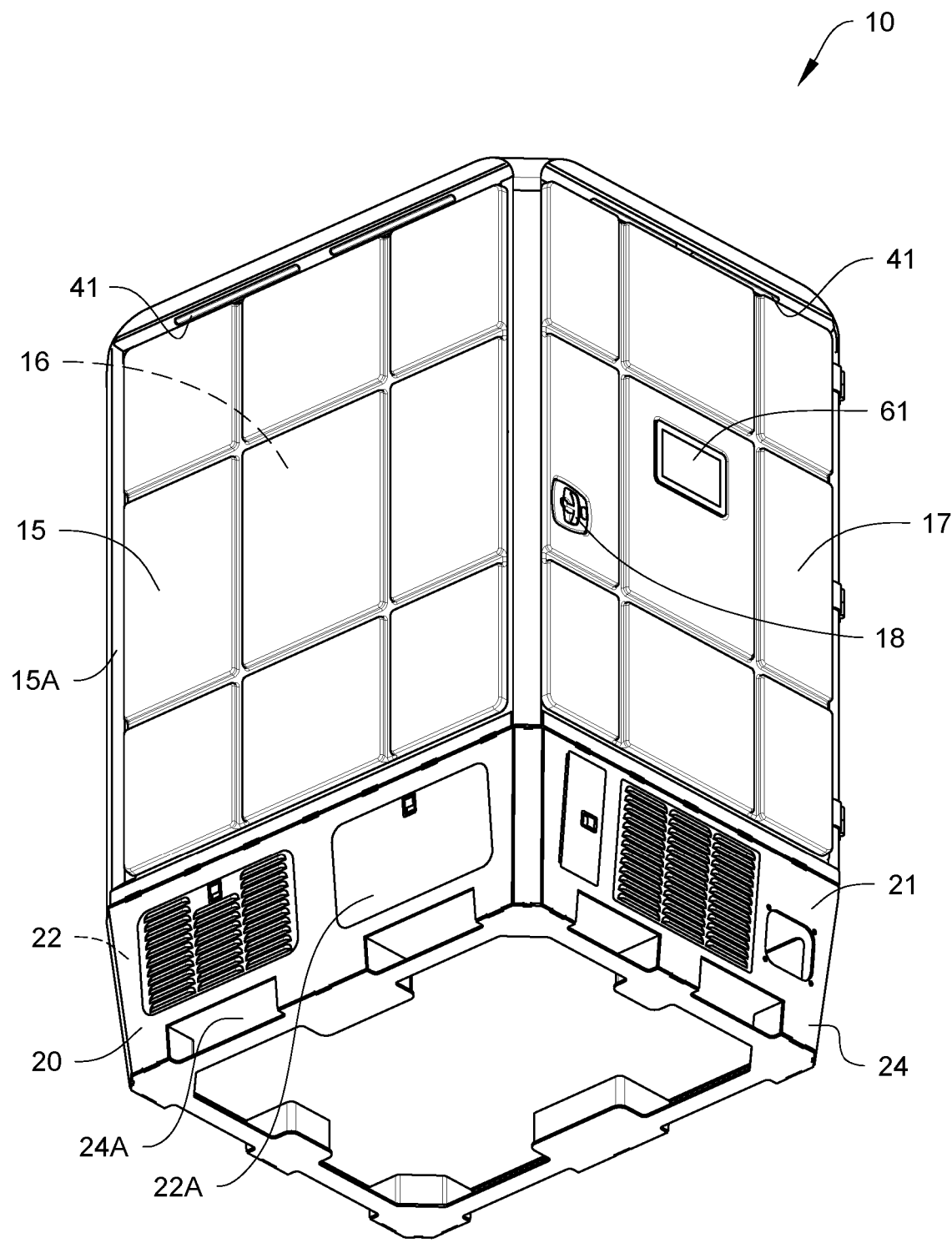
FIG. 1 is a side perspective view of a self-contained climate controlled storage unit, according to an embodiment.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent like elements that may perform the same, similar, or equivalent functions.

DETAILED DESCRIPTION

This disclosure relates generally to a self-contained climate controlled storage unit. More particularly, the disclosure relates to methods and systems for power sharing and charging coordination of self-contained climate controlled storage unit(s).

This disclosure relates generally to a self-contained climate controlled storage unit. More particularly, the disclosure relates to methods and systems for power sharing and charging coordination of self-contained climate controlled storage unit(s).

It is noted that: U.S. application Ser. No. 18/056,467, "METHOD AND SYSTEM FOR MONITORING WEIGHT/ORIENTATION OF A SELF-CONTAINED CLIMATE CONTROLLED STORAGE UNIT AND ADJUSTING OPERATION BASED ON THE MONITORED WEIGHT/ORIENTATION,"; U.S. application Ser. No. 29/868,048, "ELECTRICALLY POWERED PORTABLE SELF-CONTAINED CLIMATE CONTROLLED STORAGE UNIT,"; U.S. application Ser. No. 18/056,498, "METHODS AND SYSTEMS FOR CLEANING AN ELECTRICALLY POWERED PORTABLE SELF-CONTAINED CLIMATE CONTROLLED STORAGE UNIT,"; and U.S. application Ser. No. 18/056,502, "METHOD AND SYSTEM FOR PROVIDING AN INDICATION OF A SYSTEM OPERATING STATUS OR LOGISTICAL OPERATION STATUS OF A SELF-CONTAINED CLIMATE CONTROLLED STORAGE UNIT,"; all filed concurrently herewith on Nov. 17, 2022, and the contents of which are incorporated herein by reference.

The terms "above", "below", "top", "bottom", "left", "right", and the like described in the present application are defined according to the typical observation angle of a person skilled in the art and for the convenience of the description. These terms are not limited to specific directions but provided for ease of understanding the disclosure. As such, the terms should be interpreted broadly and can include, but not limited to, being directly adjacent, near, or spaced apart from the respective components.

A self-contained climate controlled storage unit, such as a refrigerated air freight container (e.g., Air100-RKN and AIR200-RAP from Thermo King and Envirotainer®, etc.), a portable refrigeration container (e.g., ColdCube™ container from Thermo King, Coldtainer® from Thermo King, etc.), etc., provides portable climate controlled storage for cargo (e.g., produce, frozen foods, pharmaceuticals, biologicals, for example, human tissue, blood, heart, and lung, etc.). In some instances, the cargo can be high value/critical cargo. The self-contained climate controlled storage units are typically battery powered. In some cases, a self-contained climate controlled storage unit is capable of autonomous operation (e.g., for a week or more) via battery power. In some embodiments, a full pallet of self-contained climate controlled storage units can be transported within a transport unit (e.g., a truck, a van, a trailer, an intermodal container, an airplane, etc.). Each of the self-contained climate controlled storage units can be recharged by plugging into an electrical outlet of an external power source such as, for example, utility/shore power.

In some cases, the embodiments described herein can monitor the utility charge rate (e.g., energy rate) from the utility/shore power source in real-time, and automatically control the sharing of power between one or more self-contained climate controlled storage units and an external power source to reduce the cost for providing utility/shore power to the self-contained climate controlled storage unit(s). In some cases, the embodiments described herein can actively coordinate the charging of multiple self-contained climate controlled storage units that are connected to the same external power source. The embodiments described herein can pair the independent storage units and determine a charge priority between the independent storage units, thereby optimizing a specific and desired charging of each of the storage units, rather than each storage units acting independently.

In some cases, the systems and methods described herein are directed to electrically powered self-contained climate controlled storage unit(s) that can be transported in a climate controlled or non-climate controlled transport unit, such as, airplanes, railways, trucks, vans, trailers, intermodal containers, or other similar transport units. In some cases, the self-contained climate controlled storage unit(s) can be connected to an external power source and determine whether to direct power flow to or from the external power source for a predetermined period of time based on one or more power sharing parameters. In some cases, multiple self-contained climate controlled storage units can be connected to an external power source and can be paired for an automatic coordination of charging.

While some of the embodiments discussed below are discussed with respect to a freight container, it will be appreciated that the embodiments discussed herein can be provided for any type of electrically powered self-contained climate controlled storage unit (e.g., air freight containers, portable refrigerated storage boxes, etc.).

Figure 2:
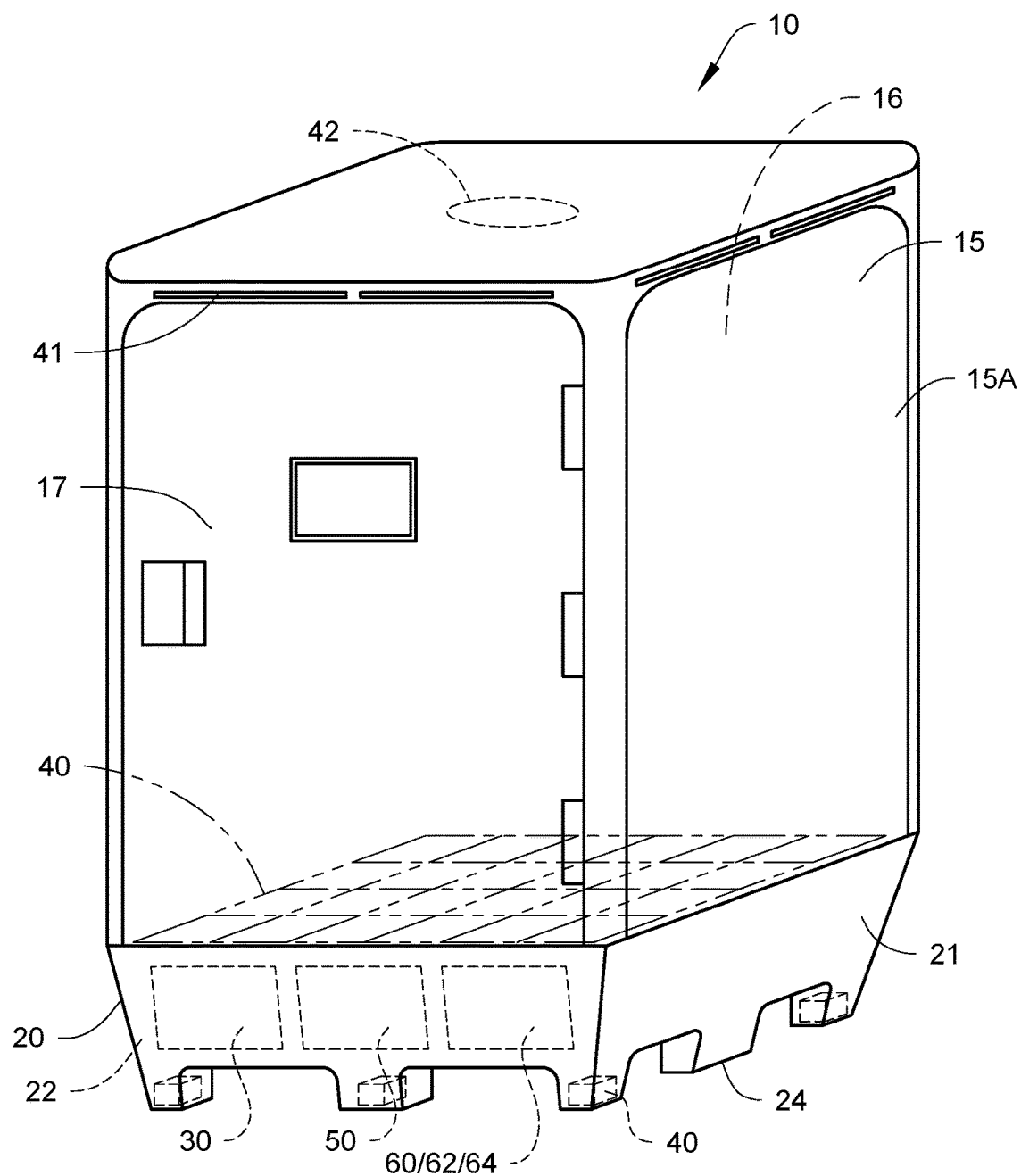
FIG. 2 is a schematic illustration of the components of a self-contained climate controlled storage unit, according to an embodiment.

FIGS. 1A-2 illustrate a self-contained climate controlled storage unit 10, according to an embodiment. The storage unit 10 includes a climate controlled space 15 and a base 20. The climate controlled space 15 is affixed to the base 20, e.g., vertically above the base 20, either directly above or to the side of the base 20. The storage unit 10 also includes a climate control system 30 for cooling and/or heating the climate controlled space 15, at least one sensor 40 for measuring at least a weight and/or orientation associated with the storage unit 10, and a controller 50 connected to the storage unit. As shown in FIG. 2, the storage unit 10 also includes a power source 60 for supplying power to the climate control system 30.

The climate controlled space 15 includes an insulated housing 15A having an interior space 16 for storing cargo.

In the illustrated embodiment, the insulated housing 15A can include insulated side, bottom, and top walls configured to generally conform to the shape required of the storage unit 10. Access to the interior space 16 can be provided via a door 17 for enclosing and/or accessing the cargo. FIG. 1 [A] illustrates a perspective view of the storage unit 10 in which the door 17 is closed. The door 17 can be kept closed by a securing mechanism 18. The securing mechanism 18 can be operable and accessible via keypad, biometrics, web, key card, mobile, a combination of the same, or the like.

In an embodiment, the climate controlled space 15 can have a width of, for example, about 30 inches to 60 inches (one inch=2.54 cm), or at about 42 inches for accommodating a standard pallet in the interior space 16. The height of the climate controlled space 15 can be, for example, between 36 inches and 120 inches, or between 36 inches and 72 inches. At larger heights, the center of gravity of the storage unit 10 may be higher and could be prone to tipping. It is to be understood that such disclosure is not intended to be limiting in scope, but provided for understanding the disclosure.

The base 20 includes a housing 21 having an enclosure 22 and one or more feet 24 for supporting the storage unit 10. In the embodiment depicted in FIG. 2, the enclosure 22 include the climate control system 30, the controller 50, and the power source 60. The enclosure 22 can be accessible via a panel or door 22A on the housing 21. In an embodiment, the feet 24 are positioned to support the storage unit 10. The feet 24 can be provided at least at the corners of the base 20 and/or at or along a center of the base 20 and/or along the edges of the base 20. Slots or openings 24A are provided between the plurality of feet 24. In some embodiments, the slots or openings 24A can have a width for accepting forks or tines of a forklift or for engaging other lifting and handling machines. In an embodiment, the feet 24 can include wheels or retractable wheels, e.g., manual, hydraulic, piston driven, or the like, to allow the moving or repositioning of the storage unit 10 without a lifting and handling machine.

The climate control system 30 is configured to provide climate control (e.g., temperature, humidity, atmosphere, etc.) within the interior space 16. In particular, the climate control system 30 can provide climate control to maintain fresh and/or frozen cargo or provide heated storage for cargo stored within the interior space 16 via vents and/or communication channels or ducts through the walls of the storage unit 10. It will be appreciated that the particular cargo is not limiting. For example, in an embodiment, the cargo can include perishable items such as food, while in another embodiment the cargo can include pharmaceuticals, biologics, or medical equipment, blood, organs, or the like. In an embodiment, the climate control system 30 can include one or more climate control circuits (not shown). Each of the one or more climate control circuits can include, for example, a compressor, a condenser, an evaporator, and an expansion valve. In an embodiment, one or more condensers (not shown), one or more condenser fans (not shown), and one or more electrical components (e.g., valve(s)) (not shown) can be housed within the climate control system 30. There can also be one or more evaporators (not shown) and one or more evaporator fans (not shown) housed within one or both of the climate control system 30 and the interior space 16 to provide climate control within the interior space 16.

The controller 50 can be configured to control and communicate with the storage unit 10, one or more electrical components, the at least one sensor 40, and/or one or more components of the climate control system 30, e.g., the compressor, the one or more condenser, and/or evaporator fans, etc. The controller 50 can include a processor and memory (not shown) for storing data and instructions. The controller 50 may further include a telematics device (not shown) that is configured to communicate with one or more remote devices such as, for example, one or more controllers 50 of other storage unit(s) 10.

In an embodiment, the controller 50 can be connected to a human machine interface (HMI) 61 that can be powered by the power source (e.g., as discussed below as power source 60). The HMI 61 can include a display, touchscreen, keypad, or the like as an interface for controlling or programming of the storage unit 10, displaying information related to the storage unit 10, or the like. In an embodiment, the information can include shipment details, weight, cargo, battery power, alert/alarm conditions, temperature, humidity, max and min temperatures, or the like. In an embodiment, the HMI 61 can be integrated with the securing mechanism 18 which has a display for displaying such information.

The power source 60 can be configured to power the storage unit 10, the controller 50, and/or the climate control system 30. The power source 60 can include a rechargeable battery system 62. The rechargeable battery system 62 can be supplied with an energy supply source, for example, when a self-contained climate controlled storage unit is in a transport unit. The rechargeable battery system 62 can be supplied with energy (i.e., charged/recharged) prior to being loaded and transported in the transport unit. The rechargeable battery system 62 can be configured to provide electrical energy to one or more components of the storage unit 10 including, for example, the controller 50, the one or more electrical components, the compressor, the one or more condenser and/or evaporator fans, etc.

The rechargeable battery system 62 can include one or more battery banks (not shown) with a DC and/or AC charge input (not shown) configured to allow an external power source to charge the one or more battery banks. When charge input includes a DC charge input, the battery source can also include a DC charge controller, a DC isolation connection, and a DC: disconnect switch. When the charge input includes an AC charge input, the battery source can also include an AC inverter, an AC charger, and an AC disconnect switch and a breaker panel.

In some cases, when the storage unit 10 sits unused, the rechargeable battery system 62 can send some of the stored power to an external power source such as utility/shore power (e.g., a grid). The storage unit 10 can include a power circuit component 64 functionally connected to the rechargeable battery system 62 and configured to direct power flow to or from the rechargeable battery system 62. The power circuit component 64 can include any suitable hardware and/or firmware executed on the hardware to provide bi-directional power flow control. One exemplary power circuit component can include one or more bi-directional inverters.

Figure 3A:
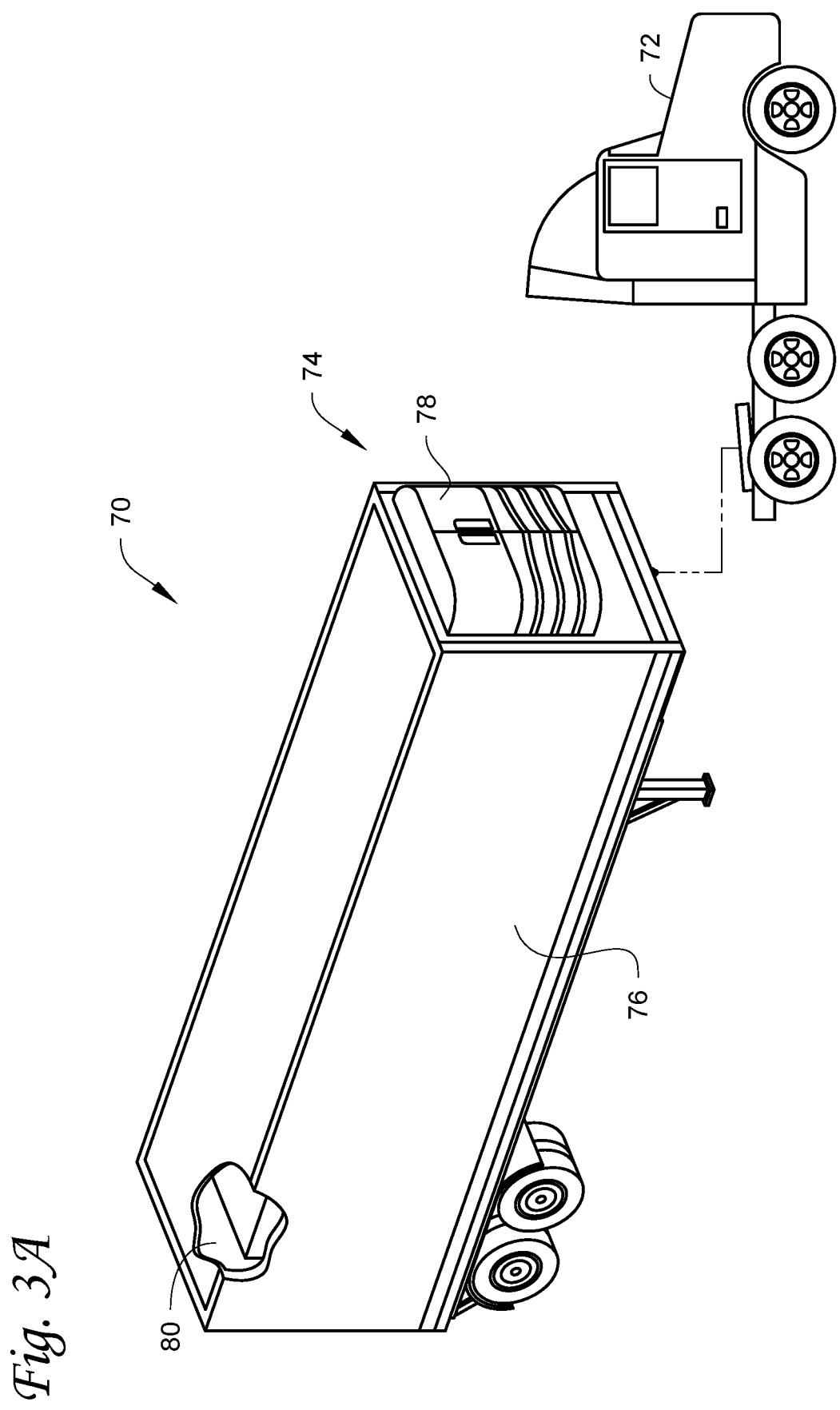
FIG. 3A is a side perspective view of a climate controlled transport unit having a trailer attached to a tractor, the trailer storing the self-contained climate controlled storage unit of FIGS. 1A and 1B, according to an embodiment.
Figure 3B:
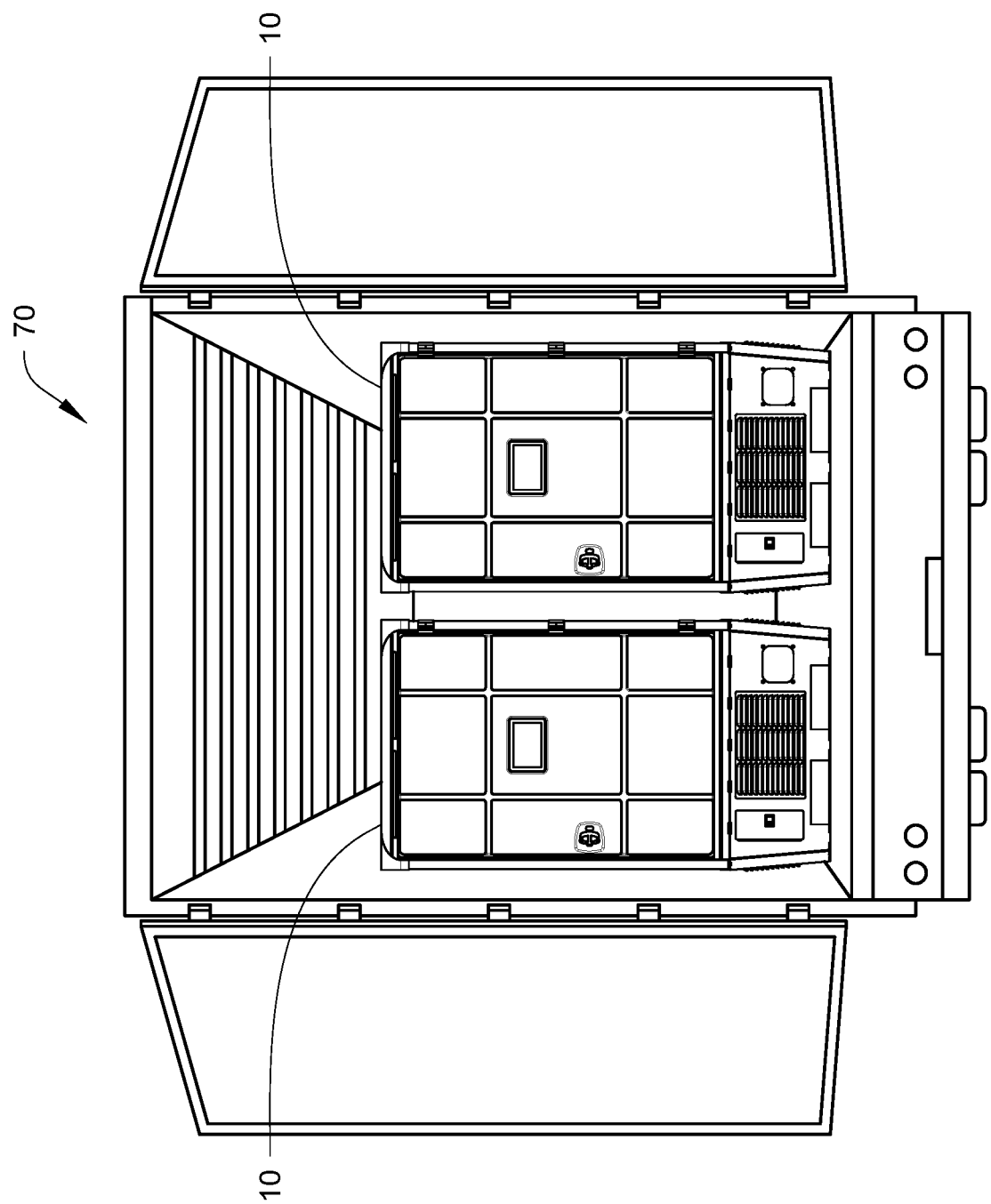
FIG. 3B is a side perspective view of a portion of the climate controlled transport unit of FIG. 3A.

FIGS. 3A and 3B illustrate a transport unit 70 attached to a tractor 72, according to an embodiment. The transport unit 70 includes a transport climate control system (TCS) 74 and a transport unit 76. The TCS 74 can be configured to control a climate (e.g., temperature, humidity, atmosphere, etc.) of an internal space 80 of the transport unit 76. In particular, the TCS 74 can be configured to transfer heat between an internal space 80 and the outside environment.

In some embodiments, the TCS 74 can be a multi-zone system in which different zones or areas of the internal space 80 are controlled to meet different climate control requirements based on the cargo stored in the particular zone. The TCS 74 can include a transport climate control unit (TCU) 78 for providing climate control within the internal space 80. The internal space 80 can store cargo including, for example, one or more self-contained climate controlled storage units 10. It is appreciated that while the transport unit 70 has been discussed as having the TCS 74, the disclosure is not intended to limit the scope. In an embodiment, the transport unit 70 can be a non-climate controlled transport unit 70. As such, the storage units 10 can provide the necessary climate control for individual cargo stored therein.

As seen in FIG. 3B, the storage units 10 can be placed and secured in the transport unit 70. It is appreciated that due to the dimensions of the storage unit 10, the storage units 10 can be placed side by side and front to back in the transport unit for compact packing and transport of the storage units 10. As such, the storage unit 10 can individually provide the climate control requirements for the cargo stored in each individual storage unit 10 based on the customer's needs.

As depicted in the embodiment of FIG. 4, the storage unit(s) 10 can be placed at an operation site 3 (e.g., a local environment) and electrically connected to an external power source 5 (e.g., a grid) providing power to the storage unit(s) 10. The operation site 3 can provide temporary housing to one or more storage units 10, and can be any electrically-powered location including commercial buildings such as, for example, a warehouse, a retail establishment, a restaurant, a food court, a supermarket, a distribution center, a shipyard, a supply yard, a farm, a manufacturing/production facility, etc. The storage unit(s) 10 include a rechargeable battery system (e.g., the rechargeable battery system 62 depicted in the embodiment of FIG. 2) with a power circuit component (e.g., the power circuit component 64 depicted in the embodiment of FIG. 2) capable of directing bi-directional power flow from the grid 5 to the rechargeable battery system (i.e., charging or recharging) or from the rechargeable battery system to the grid 5 (i.e., discharging). The storage unit(s) 10 have the ability to consume power from the grid 5 when utility charges are low and feed power back into the grid 5 during peak hours when utility charges are high. As such, the storage unit(s) 10 can provide power level loading and peach charge avoidance capabilities to the operation site 3.

While an embodiment of a storage unit (e.g., the storage unit 10) is shown in FIGS. 1A to 4, it is to be understood that an electrically powered portable self-contained climate controlled storage unit described herein may include various components and may have various configurations.

Figure 5:
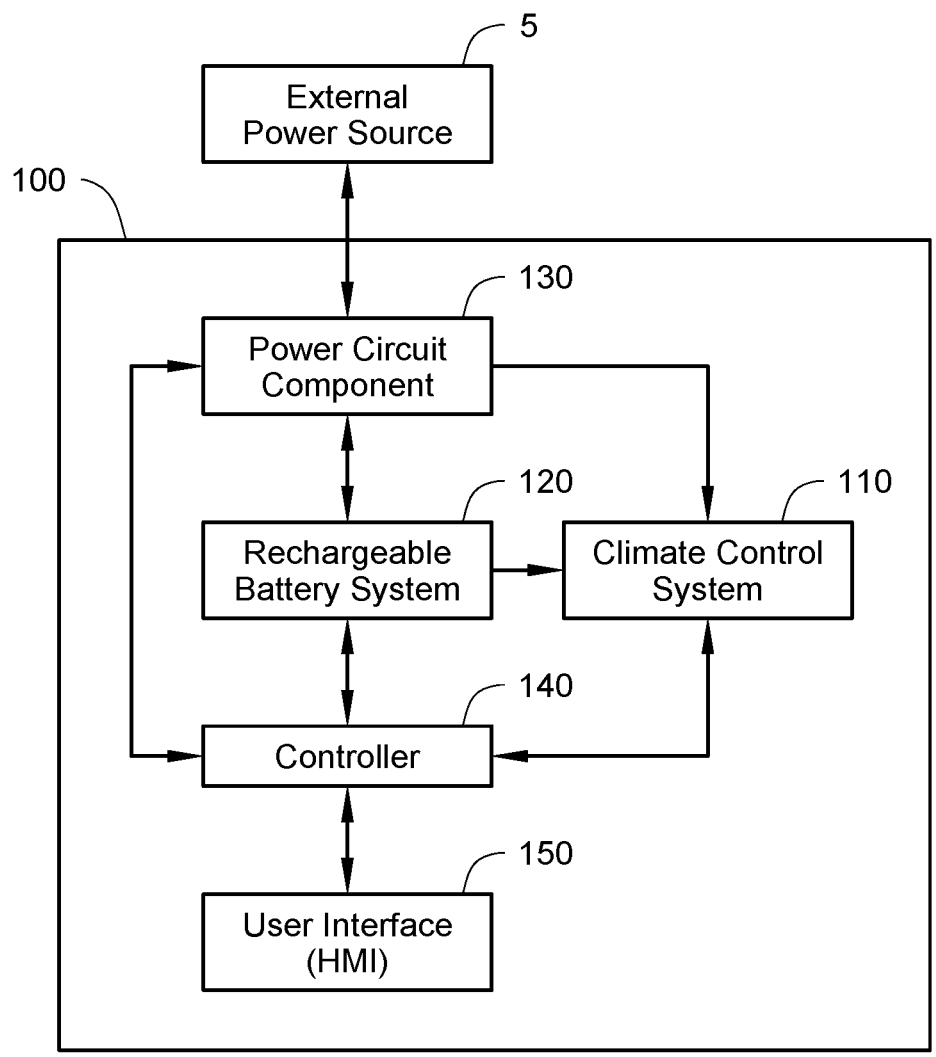
FIG. 5 is a block diagram of a self-contained climate controlled storage unit electrically connected to an external power source, according to an embodiment.

FIG. 5 illustrates a block diagram of an electrically powered portable self-contained climate controlled storage unit 100 electrically connected to an external power source 5, according to one embodiment. The storage unit 100 can be similar to the electrically powered portable self-contained climate controlled storage unit 10 shown in FIGS. 1A-4. The storage unit 100 includes a climate control system 110 to provide climate control to a climate controlled space (e.g., the climate controlled space 15 of FIG. 1A). A rechargeable battery system 120 is configured to supply DC power to the climate control system 110, and may include one or more 12-volt battery banks. A power circuit component 130 is connected to the rechargeable battery system 120. The power circuit component 130 is configured to direct DC power flow from the rechargeable battery system 120 to the external power source 5, or direct AC power flow from the external power source 5 to the rechargeable battery system 120.

The storage unit 100 further includes a controller 140 connected to and configured to control the climate control system 110, the rechargeable battery system 120, the power circuit component 130, the user interface 150, and other components of the storage unit 100. The controller 140 can control the climate control system 110 to obtain one or more environmental conditions (e.g., temperature, humidity, atmosphere, etc.) of an internal space (e.g., the interior space 16 shown in FIG. 2) of the storage unit 100. The controller 140 can further include a telematics device (not shown) that is configured to communicate with one or more remote devices such as, for example, one or more of the other controllers of storage units such as the storage unit 10 of FIG. 2 and/or the storage unit 100 of FIG. 5.

In some embodiments, the telematics device(s) of a storage unit can communicate with one or more remote devices (e.g., a controller of another storage unit such as the storage unit 10 or 100) using, for example, a short distance wireless communication protocol such as, for example, ZigBee, Bluetooth, infrared, a radio enabled protocol, a power line communication protocol, a Wi-Fi protocol, etc. Each of the controllers may have a radius in which one controller can establish short distance wireless communication with a remote device (e.g., another controller of a storage unit). A storage unit is in close proximity with a remote device (e.g., another storage unit) when the controller of the storage unit can establish short distance wireless communication with the remote device (e.g., a controller of another storage unit). In some embodiments, the telematics device(s) can communicate with one or more remote devices using, for example, a long distance wireless communication protocol such as, for example, a cellular communication protocol, etc.

In some embodiments, the controller 140 can be configured to determine whether to direct power flow to or from the rechargeable battery system 120 for a predetermined period of time based on one or more power sharing parameters. The one or more power sharing parameters may include a utility charge rate on the external power source 5 which may have time-of-use (TOU) rates. TOU metering is implemented by various utilities to ease the strain on a grid by charging the price of electricity based on the time of day. TOU may be broken into different groups (e.g., peak, off-peach, mid-peak, etc.) based on time of day and amount of electricity demanded. In some embodiments, data related to the utility charge rate on the external power source 5 can be manually entered via the user interface 150 of the storage unit 100. In some embodiments, data related to the utility charge rate can be stored, for example, in a telematics device or memory of the controller 140. The controller 140 can execute suitable algorithms to determine whether to direct power flow to or from the rechargeable battery system for a predetermined period of time based on the data related to the utility charge rate. For example, in some embodiments, when the controller 140 determines that the utility charge rate is lower than a first threshold utility charge rate, the controller 140 can instruct the power circuit component 130 to direct the power flow from the external power source 5 to the rechargeable battery system 120. In some embodiments, when the controller 140 determines that the utility charge rate is higher than a second threshold utility charge rate, the controller 140 can instruct the power circuit component 130 to prevent directing the power flow from the external power source 5 to the rechargeable battery system 120. In some embodiments, when the controller 140 determines that the utility charge rate is higher than a third threshold utility charge rate, the controller 140 can instruct the power circuit component 130 to direct DC power flow from the rechargeable battery system 120 to the external power source 5. In some embodiments, when the controller 140 determines that the utility charge rate is lower than a fourth threshold utility charge rate, the controller 140 can instruct the power circuit component 130 to prevent directing DC power flow from the rechargeable battery system 120 to the external power source 5.

In some embodiments, the one or more power sharing parameters may include a battery state of charge of the rechargeable battery system 120. The controller 140 can determine the battery state of charge of the rechargeable battery system 120. For example, in some embodiments, the controller 140 may include measurement circuitry to monitor/measure, for example, an open circuit voltage of batteries of the rechargeable battery system 120 to determine the battery state of charge of the rechargeable battery system 120. It is to be understood that the measurement circuitry may be included in the rechargeable battery system 120, and may be configured to measure any suitable parameters of the batteries for the controller 140 to determine the battery state of charge. In some embodiments, when the controller 140 determines that the battery state of charge is higher than a first threshold level, the controller 140 can instruct the power circuit component 130 to direct DC power flow from the rechargeable battery system 120 to the external power source 5. In some embodiments, when the controller 140 determines that the battery state of charge is lower than a second threshold level, the controller 140 can instruct the power circuit component 130 to prevent directing DC power flow from the rechargeable battery system 120 to the external power source 5.

In some embodiments, when the controller 140 determines that the battery state of charge of the rechargeable battery system 120 is higher than a third threshold level, the controller 140 can instruct the rechargeable battery system 120 to supply DC power to the climate control system 110. In some embodiments, when the controller 140 determines that the battery state of charge of the rechargeable battery system 120 is lower than a fourth threshold level, the controller 140 can generate an alert or notification and present the alert or notification on the user interface 150.

The user interface 150 can include a human machine interface (HMI) such as the HMI 61 of FIG. 1A. The user interface 150 can receive a user's input indicating whether to direct power flow to or from the rechargeable battery system 130 for a predetermined period of time. In some embodiments, the user interface 150 can receive the user's input indicating that the storage unit 100 is in a standby mode to wait for the automatic determination from the controller 140. For example, in some embodiments, the user interface 150 may include a standby button to allow a user to push the standby button to instruct the storage unit 100 into the standby mode. In some embodiments, the user interface 150 may include a charge button to instruct the storage unit 100 to immediately direct power flow from the external power source 5 to the rechargeable battery system 120 to charge/recharge the rechargeable battery system 120, without waiting for the instructions from the controller 140. As such, the controller 140 may allow the user's manual input to override the automatic determination from the controller 140 on whether to direct power flow to or from the rechargeable battery system 120.

Figure 6:
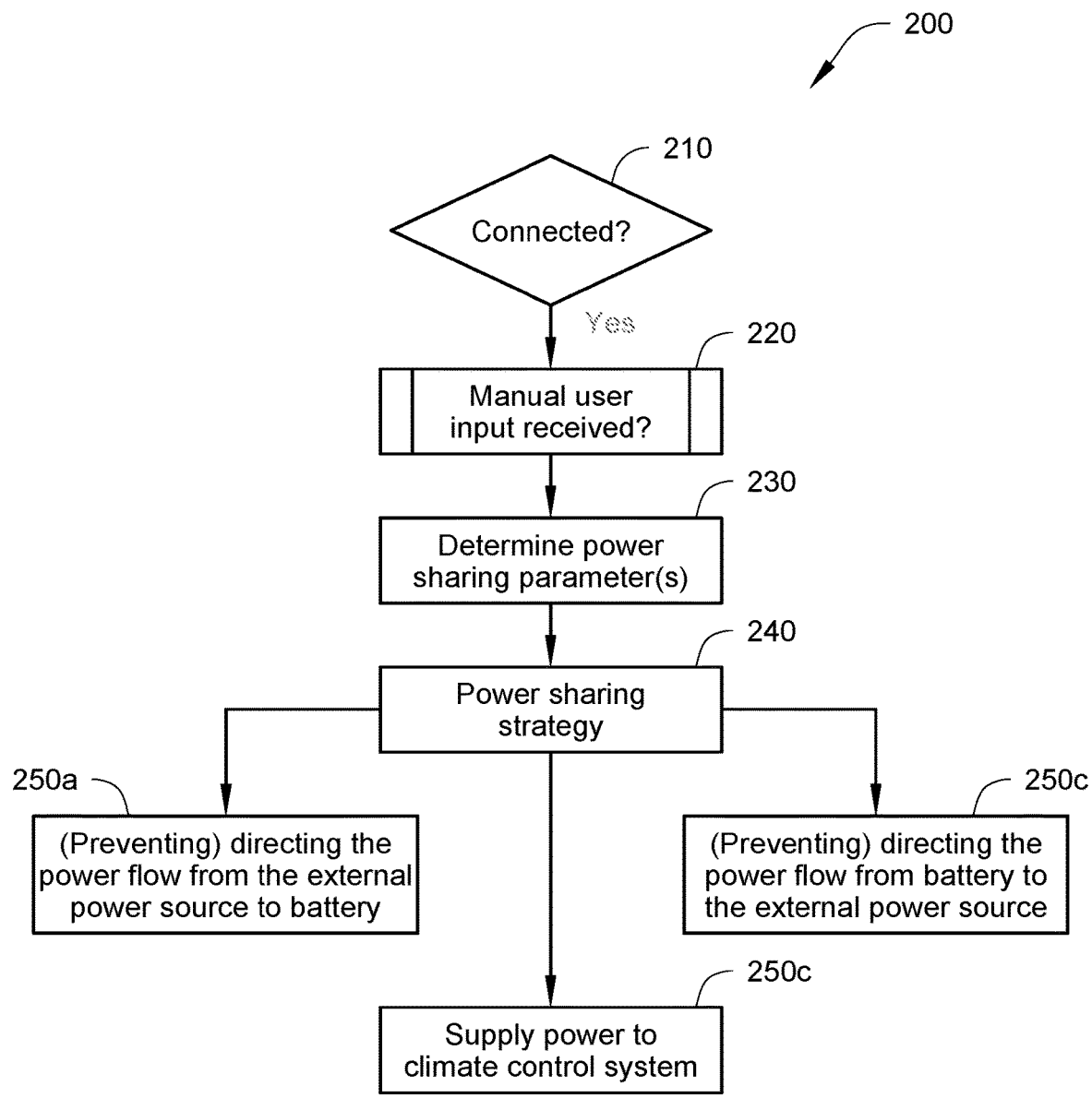
FIG. 6 is a flowchart of a method for automatically sharing power between a self-contained climate controlled storage unit and an external power source, according to an embodiment.

FIG. 6 is a flowchart of a method 200 to automatically control the power sharing between a self-contained climate controlled storage unit and an external power source, according to an embodiment. The method 200 can be implemented by any self-contained climate controlled storage unit(s) described herein such as, for example, the storage unit(s) 10 shown in the embodiments of FIGS. 1A-4 and the storage unit 100 shown in the embodiment of FIG. 5.

At 210, a controller of the storage unit determines whether the self-contained climate controlled storage unit is connected to an external power source. For example, in the embodiment of FIG. 5, the controller 140 can determine whether the rechargeable battery system 120 of the storage unit 100 is connected to the external power source 5 via the power circuit component 130. In some embodiments, the storage unit may include, for example, a voltage sensor to detect the connection to an external power source. When the controller determines that the storage unit is connected to the external power source, the controller determines whether a user's manual input is received at 220. When the controller determines that the storage unit is not connected to the external power source, the controller may present an instruction/notification on the user interface to the user indicating the status of connectivity to an external power source. When the controller determines that a user's manual input is received at 220, e.g., via the user interface, the controller can instruct the storage unit to follow the user's instruction on whether to direct power flow to or from the rechargeable battery system for a predetermined period of time. In some embodiments, the controller may receive the user's manual input to initiate power sharing between the rechargeable battery system and the external power source. The controller may present, via the user interface, an inquiry to the user to clarify whether to start power sharing immediately or go to a standby mode to wait for the automatic determination from the controller on whether to direct power flow to or from the rechargeable battery system for a predetermined period of time. In some embodiments, the controller may receive the user's manual input to set time of day for charging and discharging the rechargeable battery system. The user's manual input may be stored in memory of the controller and retrieved by the controller to execute suitable algorithm(s) to override the controller's automatic determination on whether to direct power flow to or from the rechargeable battery system. In some embodiments, the controller may receive the user's manual input to set one or more of the power sharing parameters. The user's manual input can be stored in memory of the controller and retrieved by the controller to execute suitable algorithm(s) to determine whether to direct power flow to or from the rechargeable battery system. The method 200 then proceeds to 230.

At 230, the controller determines one or more power sharing parameters. The determined power sharing parameters may include, for example, a utility charge rate on the external power source, a battery state of charge of the rechargeable battery system, an electrical load of the storage unit, etc. In some embodiments, the controller can determine the utility charge rate based on data of time-of-use (TOU) rates of the external power source which may be stored in memory of the controller or received from a user's manual input. In some embodiments, the controller can determine the battery state of charge of the rechargeable battery system by, for example, monitoring or measuring battery working parameter(s) (e.g., an open circuit voltage) of the rechargeable battery system. In some embodiments, the controller can determine an electrical load on one or more of energy load sources of the storage unit. The energy load source(s) may include, for example, a climate control system such as the climate control system 110 of FIG. 5. The electrical load may indicate the amount of energy required for the storage unit to reach a desired environmental condition (temperature, humidity, atmosphere, etc.), etc. The electrical load can be determined by measuring, for example, a load current, a load power, a load voltage of the energy load source(s). For example, the controller can determine the energy load by receiving a load current value from one or more current sensors. The method 200 then proceeds to 240.

At 240, the controller determines a power sharing strategy indicating whether to direct power flow to or from the rechargeable battery system for a predetermined period of time based on the one or more power sharing parameters determined at 230. 250*a-c* are non-limiting examples of aspects of the power sharing strategy determined by the controller based on the one or more power sharing parameters. It will be appreciated that one or more of these examples (and other examples not described below) may be combined to determine the power sharing strategy, e.g., between one or more storage units and an external power source.

At 250*a*, based on the determined utility charge rate on the external power source, the controller can determine whether to instruct a power circuit component (e.g., the power circuit component 130 of FIG. 5) to direct power from the external power source to the rechargeable battery system to charge or recharge the rechargeable battery system. In some embodiments, the controller can determine and indicate (i) directing the power flow from the external power source to the rechargeable battery system when the utility charge rate is lower than a first threshold utility charge rate, and (ii) preventing directing the power flow from the external power source to the rechargeable battery system when the utility charge rate is higher than a second threshold utility charge rate.

At 250*b*, based on the determined utility charge rate on the external power source or the determined battery state of charge of the rechargeable battery system, the controller can determine whether to instruct a power circuit component (e.g., the power circuit component 130 of FIG. 5) to direct DC power from the rechargeable battery system to the external power source. In some embodiments, the controller can determine and indicate (i) directing the power flow from the rechargeable battery system to the external power source when the utility charge rate is higher than a first threshold level, and (ii) preventing directing the power flow from the rechargeable battery system to the external power source when the utility charge rate is lower than a second threshold level. In some embodiments, based on the determined battery state of charge of the rechargeable battery system, the controller can determine and indicate (i) directing the power flow from the rechargeable battery system to the external power source when the battery state of charge is higher than a third threshold level, and (ii) preventing directing the power flow from the rechargeable battery system to the external power source when the battery state of charge is lower than a fourth threshold level.

At 250*c*, based on the determined electrical load on one or more of energy load sources (e.g., a climate control system) of the storage unit, the controller can determine whether to supply energy from the rechargeable battery system to the climate control system. For example, in some embodiments, the controller can determine whether the electrical load of the climate control system is greater than a threshold electrical load. When the electrical load is greater than the threshold electrical load, power is supplied from the rechargeable battery system to the climate control system. When the electrical load is lower than the threshold electrical load, the controller can determine and indicate to stop supplying power from the rechargeable battery system to the climate control system.

In some embodiments, the controller may also determine the power sharing strategy based on shipment information of the storage unit. The shipment information can include a variety of information. Examples of suitable information include, but are not limited to, a duration of the shipment; an estimated time of arrival; a geolocation (e.g., a global position system (GPS) location) of the storage unit; a time of day; a weather forecast; an expected transit route; intended stops during transit; or the like. It will be appreciated that the shipment information can include combinations or subsets of the shipment information, according to an embodiment. In an embodiment, the shipment information can include driver log data as obtained from an electronic logging device (ELD) associated with the storage unit.

Figure 7:
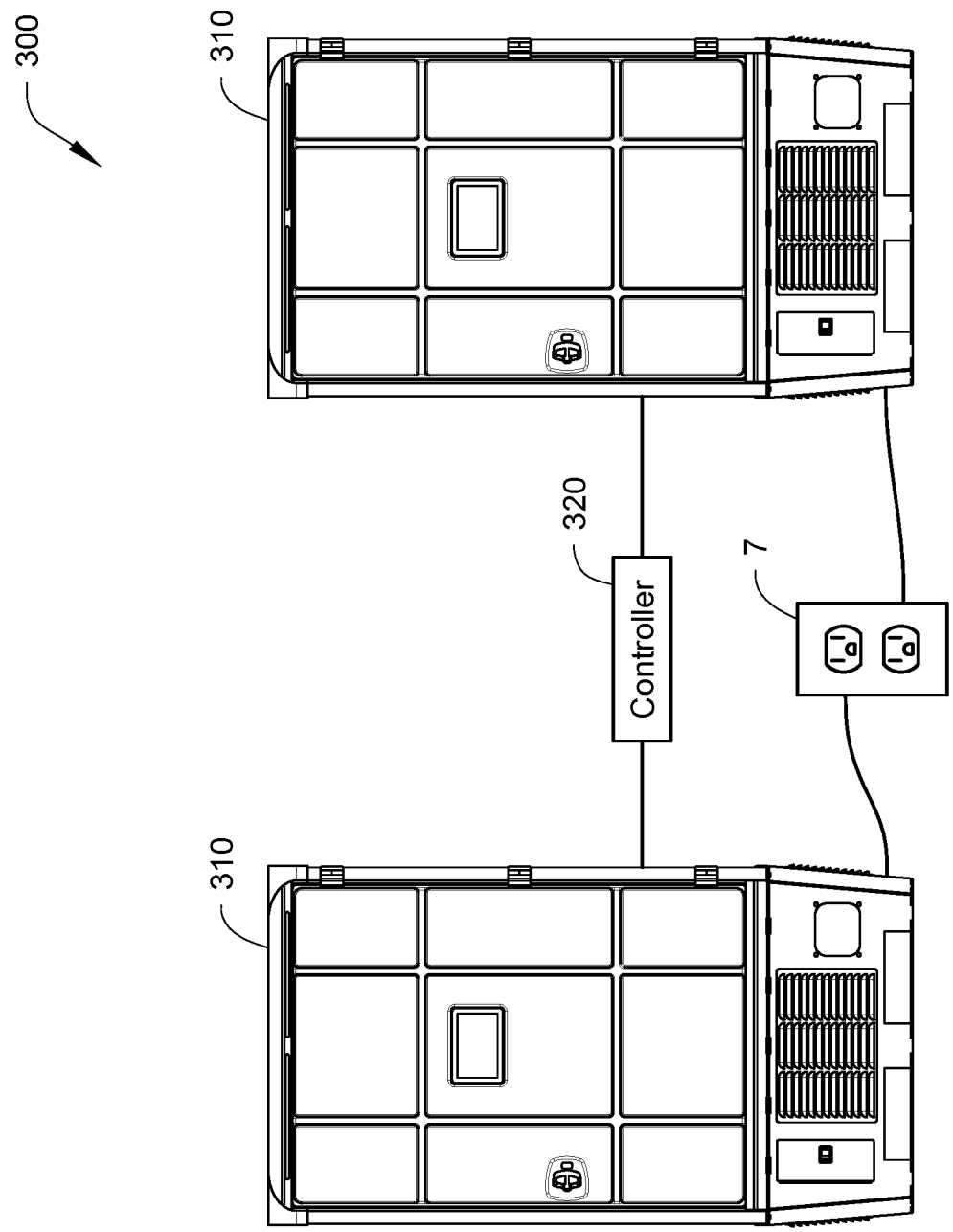
FIG. 7 is a schematic diagram of multiple self-contained climate controlled storage units coordinated with each other for charging/discharging, according to an embodiment.

The present disclosure further describes methods and systems of coordinating charging of multiple electrically powered portable self-contained climate controlled storage units (e.g., the storage unit 10 shown in FIGS. 1A-4, and the storage unit 200 shown in FIG. 5) to be connected to an external power source. FIG. 7 is a schematic diagram of a coordinated control system 300 including multiple (i.e., two or more) self-contained climate controlled storage units 310 coordinated with each other for charging/discharging, according to an embodiment. The system 300 includes multiple electrically powered portable self-contained climate controlled storage units 310 to be connected to an external power source (not shown) via one or more electrical outlets 7 of the external power source. The external power source can be, for example, utility/shore power. The electrical outlets 7 can include, for example, a standard 110V/15 A outlet, that can provide approximately 1.5 kW of power. Referring again to FIG. 2 or FIG. 5, each storage unit 310, 10, or 100 can include: a climate control system (e.g., the climate control system 30, 110 in FIG. 2 or 5) configured to provide climate control to an internal climate controlled space (e.g., the interior space 16 in FIG. 2); and a power source (e.g., the power source 60 in FIG. 2) to supply power to the climate control system. The power source can include a rechargeable battery system (e.g., the rechargeable battery system 62, 120 in FIG. 2 or 5). While two storage units are illustrated in FIG. 7, it is to be understood that more than two storage units (e.g., 3, 4, 5, or more than 5, no upper limit on number) can be included in the system 300 to coordinate charging/discharging. In other words, the storage units shown in FIG. 7 can be two of many storage units that may join to form a group in the system 300 and may leave the system 300 at an indefinite time. The multiple storage units 310 are connected to the electrical outlets 7, each of which is connected to the same external power source. The external power source can be a utility/shore power at a local environment or operation site such as, for example, the grid 5 at the local environment or operation site 3 as shown in the embodiment of FIG. 4.

In the embodiment depicted in FIG. 7, the multiple storage units 310 are co-located and plugged into the same external power source via the electrical outlets 7. In some cases, the power requirements on the external power source may not be sufficient to support more than a given number of storage units effectively. The coordinated control system 300 is configured to actively coordinate the functioning and control of the multiple storage units 310 when they are in close proximity relative to each other and are generally stationary. The coordinated control system 300 can include a controller 320 to pair the multiple storage units 310 and coordinate the charging/discharging of the rechargeable battery systems of the respective multiple storage units 310 based on a determined charge priority for each storage unit

310. The charge priority may be determined based on, for example, a battery state of charge and an electrical load of each storage unit 310. In this manner, the coordinated control system 300 can obtain an automatic shifting of charging/discharging amongst the multiple storage units 310 such that the rechargeable battery systems in the system 300 can have an optimal collective state of charging/discharging to provide power to their respective storage units 310.

In some embodiments, the controller 320 of the coordinated control system 300 can include a controller from one or more of the storage units of the system (e.g., the controller 30 of the storage unit 10 in FIG. 2, the controller 140 of the storage unit 100 in FIG. 5). In some embodiments, the controller 320 of the coordinated control system 300 can include an optional operation site control center and/or an optional remote control center, which can serve as a hub controller of the coordinated control system 300.

The controller 320 of the coordinated control system 300 can determine whether each of the multiple storage units 310 are stationary for a predetermined period of time (e.g., about 5 minutes, ten minutes, half an hour, etc.). When the controller is a controller of the storage units 310, the controller can determine that the storage unit(s) 310 are stationary based on, for example, one or more sensors connected to the storage unit(s) 310, monitoring a global positioning system (GPS) signal of the storage unit(s) 310, etc. When the controller 320 is part of a control center (e.g., a hub controller), the control center can determine that the storage unit(s) 310 are stationary based on, for example, a communication signal sent from the controller of the storage unit(s) 310 to the control center indicating the location of the storage unit(s) 310, monitoring a GPS signal of the storage unit(s) 310, etc.

The controller 320 of the coordinated control system 300 can identify whether the multiple storage units are in close proximity with respect to each other. In some embodiments, the controller 320 of the coordinated control system 300 can determine that a first storage unit 310 is in close proximity with a second storage unit 310 when short distance wireless communication can be established between the first and second storage units, e.g., via the respective telematics devices of the storage units 310.

The controller 320 of the coordinated control system 300 can determine whether the multiple storage units are connected to one or more electrical outlets 7 of the same external power source. The controller of a storage unit can determine whether the power source of the storage unit is plugged in for charging the rechargeable battery system from an external power source, e.g., a shore power (e.g., the grid 5 of FIG. 4) or power from a transport unit (e.g., the transport unit 70 of FIG. 3A). For example, in some embodiments, each storage unit 310 may include a voltage sensor to detect the plug-in. When the controller 320 of the coordinated control system 300 determines that first and second storage units 310 are connected to an external power source for charging, the first and second storage units 310 are stationary for a predetermined period of time (e.g., about 5 minutes, ten minutes, half an hour, etc.), and the first and second storage units 310 are in close proximity with respect to each other, the controller 310 of the coordinated control system 300 can determine that the first and second storage units are connected to the same external power source for charging.

In some embodiments, the controller 320 can instruct the storage unit(s), e.g., via the respective power circuit components, to send an electrical input (e.g., pinging) to the external power source and detect a feedback from the external power source upon the electrical input to determine whether the multiple storage unit(s) are connected to the same external power source. For example, in some embodiments, the controller 320 can instruct the storage unit(s) to fluctuate their respective power draw from the external power source and detect the effect on a characteristic parameter (e.g., voltage) of the external power source to whether the multiple storage unit(s) are connected to the same external power source.

In some embodiments, the controller 320 can determine whether the external power source is limiting the charge potential of the multiple storage units when the multiple storage units are connected to the same external power source. For example, in some embodiments, the system 300 may include one or more sensors (e.g., a voltage sensor) monitor one or more characteristic parameters (e.g., voltage) of the external power source. The controller 320 can determine whether the monitored characteristic parameter (e.g., voltage) is below a predetermined threshold. When the controller 320 determines that the monitored characteristic parameter (e.g., voltage) is below the predetermined threshold, the controller 320 can coordinate the charging of the multiple storage units by the external power source to prevent possible damage to electrical circuits (e.g., a circuit breaker) of the external power source or the system.

The controller 320 of the coordinated control system 300 is configured to pair the multiple storage units 10 to form a group after (i) determining that each of the multiple storage units are stationary for a predetermined period of time, (ii) identifying that the multiple storage units are in close proximity with respect to each other, and (iii) determining that the multiple storage units are connected to one or more electrical outlets of the same external power source. For example, when the controller of the coordinated control system 300 determines that (i) the multiple storage units 10 are co-located within a radius of, for example, 10 feet to 50 feet, (ii) the multiple storage units 10 each remain stationary for, for example, over 5 minutes to 60 minutes, and (iii) each of the multiple storage units 10 are connected to an external power source, the controller 320 of the coordinated control system 300 can instruct to pair the multiple storage units 310 to form a group to actively coordinate the charging/discharging and control of the group of storage units 310, which will be discussed further below.

In some embodiments, the controller 320 of the coordinated control system 300 can pair the multiple storage units 310 by performing, for example, a handshake. In a process of handshake, the controller 320 can instruct the storage units each to exchange, e.g., via their respective telematics devices, a signal to regulate or coordinate data transfer therebetween. In some embodiments, the controller of the coordinated control system 300 can receive, via a user interface of a storage unit (e.g., the user interface 150 of the storage unit 100 in FIG. 5), a user's manual input indicating an identification (e.g., a serial number) of each storage unit to be paired as a group. With the received identifications, the telematics devices of the storage units 310 can identify and recognize each other and provide coordinated operation of the group of storage units 310 that are located in close proximity to each other and plugged into the same external power source for charging/discharging.

Figure 8:
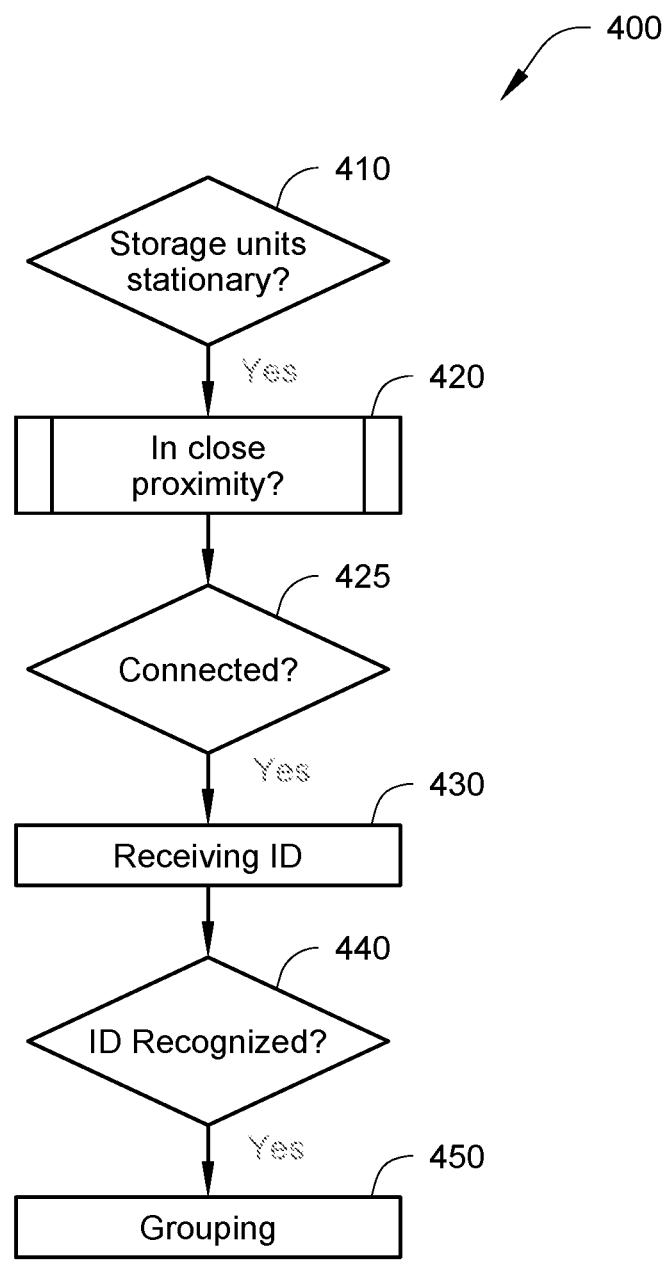
FIG. 8 is a flowchart of a method for pairing multiple self-contained climate controlled storage units, according to an embodiment.

FIG. 8 illustrates a flowchart of a method 400 of automatically pairing multiple storage units 310 using the coordinated control system 300 of FIG. 7, according to an embodiment. The method 400 can be implemented by a single controller (e.g., the controller 320 in FIG. 7). It will be appreciated that in other embodiments, the method 400 can be implemented by multiple controllers that may be located in multiple locations. In some embodiments, the controller can be a controller of a first storage unit of the multiple storage units 310. In some embodiments, the controller can be part of a control center that is separate from the multiple storage units 310.

The method 400 begins at 410, whereby a controller determines whether a first storage unit of the two or more storage units 310 has been stationary for a predetermined period of time. When the controller is part of a control center, the control center can determine that the first storage unit is stationary based on, for example, a communication signal sent from the controller of the first storage unit to the control center indicating the location of the first storage unit, monitoring a GPS signal of the first storage unit, etc. When the controller determines that the first storage unit has been stationary for the predetermined period of time, the method 400 then proceeds to 420. When the controller determines that the first storage unit is not stationary, the method 400 then proceeds back to 410.

At 420, the controller waits for the first storage unit to be in close proximity to other storage unit(s) 310. When the controller is a controller of the first storage unit, the controller can determine that the first storage unit is in close proximity to other storage unit(s) based on, for example, whether the controller is able to establish short distance wireless communication with the other storage unit(s). When the controller is part of a control center, the control center can determine that the first storage unit is in close proximity to other storage unit(s) 310 based on, for example, monitoring a GPS signal of the first storage unit and GPS signal(s) of the other storage unit(s) 310, information received from the storage units, etc. When the controller determines that the first storage unit is in close proximity to other storage unit(s) 310, the method 400 then proceeds to 425.

At 425, the controller determines whether the first storage unit is connected to an external power source (e.g., being plugged into a grid via an electrical outlet). In some embodiments, the first storage unit may include a sensor to detect the connection to the external power source and send the detection signal to the controller to make the determination. When the controller determines that the first storage unit is connected to the external power source, the method 400 then proceeds to 430. When the controller determines that the first storage unit is not connected to the external power source, the method 400 then proceeds back to 425, waiting for the detection of connection to the external power source.

At 430, the controller receives a signal from the storage unit(s) 310 indicating their respective identifications. In some embodiments, an identification may be a unique serial number of a storage unit. In some embodiments, the storage unit(s) 310 can automatically send, e.g., via their respective telematics device(s), a signal to the controller to indicate the identification(s). In some embodiments, the controller may receive, e.g., via a user interface of the storage unit(s) 310, a user's manual input indicating the identification(s). After receiving the identification(s) of the storage unit(s) 320, the controller can determine whether the identification(s) are recognized at 440. For example, in some embodiments, the controller can compare the received serial number of a storage unit to a list of serial numbers stored in the system 300. When the controller determines that the received identification(s) are recognized, the controller can pair or group the recognized storage unit(s) 320 at 450 by, for example, a handshake, i.e., to exchange via their respective telematics devices, a signal to regulate data transfer therebetween.

Figure 9:
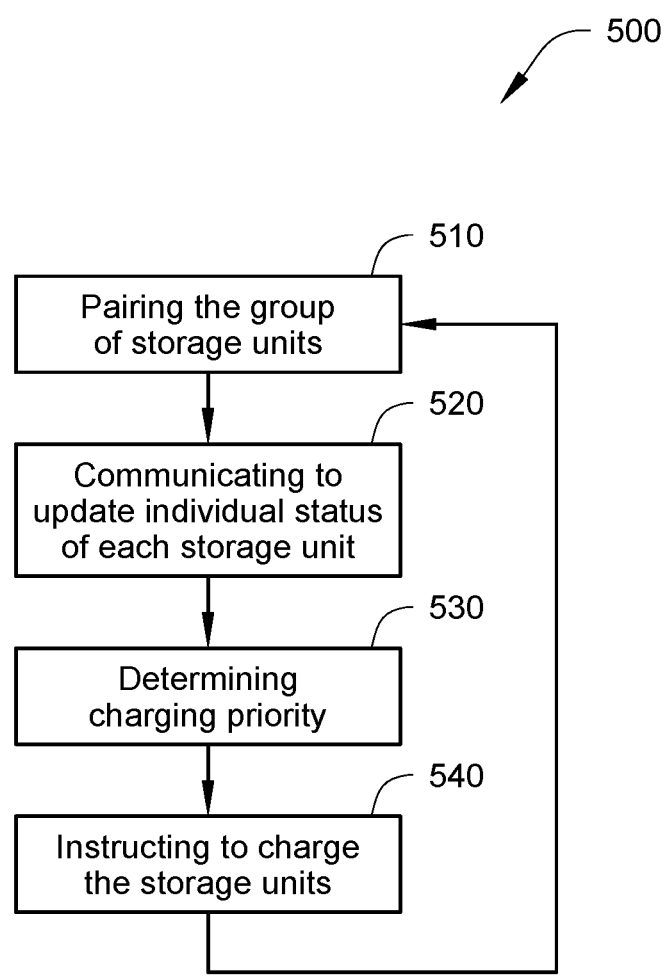
FIG. 9 is a flowchart of a method for automatically managing power of a system including multiple self-contained climate controlled storage units, according to an embodiment.

FIG. 9 is a flowchart of a method 500 for automatically managing power of the system 300 in FIG. 7 including two or more self-contained climate controlled storage units 310, according to an embodiment. The methods 500 begins at 510, whereby a controller pairs the two or more self-contained climate controlled storage units 310 to form a group. In some embodiments, the controller can automatically pair the multiple storage units 310 according to the method 400 of FIG. 8. While paring the group of storage units 310, the controller can monitor whether there is any storage unit(s) join or leave the group.

At 520, the controller instructs each storage units 310 within the group to communicate to update individual status. The controller may send a request for updating individual status at predetermined periods of time (e.g., every minute, every 5 minutes, every 10 minutes, etc.). When receiving the request from the controller, each storage units 310 may send, for example, via the respective telematics devices, the respective real-time data indicating individual status to the controller. The real-time data indicating individual status may include, for example, a battery state of charge of a rechargeable battery system in the storage unit, an electrical load from one or more of energy load sources of the storage unit, the value of cargo stored in the storage unit, etc. In some embodiments, a user can input cargo information (e.g., the value of cargo stored in the refrigerated transport unit, desired environment condition range (e.g., temperature range, humidity range, atmosphere range, etc.) for the cargo stored in the storage unit, etc.). In some embodiments, the cargo information can be received and stored in a telematics device of the storage unit. The method 500 then proceeds to 530.

At 530, the controller determines a charge priority based on the updated individual status of each storage unit within the group. The controller can execute any suitable algorithms to determine the charge priority. The following are non-limiting examples of aspects of the charge priority. It will be appreciated that one or more of these examples (and other examples not described below) may be combined to form the charge priority. For example, the controller can determine a charge priority of the storage units that can be turned on for charging, using an external power source, at any particular time. In other words, the controller can determine the successive order of charging the two or more storage units that are plugged into the same external power source.

In one example, the priority to startup of charging can be based on a state of charge of the storage unit. A first storage unit has a relatively lower state of charge can have a higher priority than a second storage unit within the group. In another example, the priority to startup of charging can be based on an electrical load of the storage unit. A first storage unit has a relatively higher electrical load can have a higher priority than a second storage unit within the group. In another example, the controller can determine a duration of the power being charging to the first storage unit having the higher priority is greater than a time threshold. When the duration is less than the time threshold, power can continue to be supplied to charge the first storage unit. When the duration is greater than the time threshold, the controller can determine to discontinue supplying power to charge the first storage unit, and start to supply power to charge the second storage unit that is waiting for the charging.

In another example, the controller can determine preventing simultaneous startup of charging two or more of the plurality of storage units when the two or more storage units are being connected to the external power source. For example, when the controller determines that first and second storage units having substantially the same priority based on the individual status (e.g., substantially the same state of charge, and substantially the same electrical load), the controller can instruct one of the first and second storage units to turn on charging for a predetermined period of time, and instruct the other one to wait for the predetermined period of time before automatically turning on charging.

In another embodiment, the controller may determine the charge priority based on shipment information of the storage unit. The shipment information can include a variety of information. Examples of suitable information include, but are not limited to, a duration of the shipment; an estimated time of arrival; a geolocation (e.g., a global position system (GPS) location) of the storage unit; a time of day; a weather forecast; an expected transit route; intended stops during transit; or the like. It will be appreciated that the shipment information can include combinations or subsets of the shipment information, according to an embodiment. In an embodiment, the shipment information can include driver log data as obtained from an electronic logging device (ELD) associated with the storage unit. The charge priority can include, for example, providing power from the external power source to the self-contained climate controlled storage unit which is furthest from its set point, and switching to provide power to a second self-contained climate controlled storage unit when it is determined that the second self-contained climate controlled storage unit is the furthest from its set point. The charge priority can, for example, attempt to control the power supplied from the external power source so that the charge in the storage unit can last as long as possible during the trip duration before being depleted.

ASPECTS

It is to be appreciated that any one of aspects 1-11, 12-20 and 21-26 can be combined together.

Aspect 1 is an electrically powered portable self-contained climate controlled storage unit, comprising:
a base comprising an enclosure;
a climate controlled space affixed to the base;
a climate control system at least partially received in the enclosure, and configured to provide climate control to the climate controlled space,
a power source configured to supply power to the climate control system, the power source including a rechargeable battery system received in the enclosure;
a power circuit component connected to the rechargeable battery system, the power circuit component configured to direct power flow to or from the rechargeable battery system; and
a controller configured to obtain one or more power sharing parameters and configured to determine whether to direct power flow to or from the rechargeable battery system for a predetermined period of time based on the one or more power sharing parameters.

Aspect 2 is the electrically powered portable self-contained climate controlled storage unit of aspect 1, wherein the power circuit component is configured to connect the rechargeable battery system to an external power source and direct a bi-directional power flow therebetween.

Aspect 3 is the electrically powered portable self-contained climate controlled storage unit of aspect 2, wherein the controller is configured to determine whether to direct power flow from the external power source to the rechargeable battery system to charge the rechargeable battery system based on the one or more power sharing parameters.

Aspect 4 is the electrically powered portable self-contained climate controlled storage unit of aspect 3, wherein one or more power sharing parameters include a utility charge rate, and
wherein the controller is configured to determine the utility charge rate on the external power source, and (i) direct the power flow from the external power source to the rechargeable battery system when the utility charge rate is lower than a first threshold utility charge rate, and (ii) prevent the power flow from the external power source to the rechargeable battery system when the utility charge rate is higher than a second threshold utility charge rate.

Aspect 5 is the electrically powered portable self-contained climate controlled storage unit of any one of aspects 2-4, wherein the controller is configured to determine whether to direct power from the rechargeable battery system to the external power source based on the one or more power sharing parameters.

Aspect 6 is the electrically powered portable self-contained climate controlled storage unit of aspect 5, wherein one or more power sharing parameters include a utility charge rate, and
wherein the controller is configured to determine the utility charge rate on the external power source, and (i) direct the power flow from the rechargeable battery system to the external power source when the utility charge rate is higher than a first threshold utility charge rate, and (ii) prevent the power flow from the rechargeable battery system to the external power source when the utility charge rate is lower than a second threshold utility charge rate.

Aspect 7 is the electrically powered portable self-contained climate controlled storage unit of aspect 5 or 6, wherein one or more power sharing parameters include a battery state of charge of the rechargeable battery system, and
wherein the controller is configured to determine the battery state of charge of the rechargeable battery system, and (i) direct the power flow from the rechargeable battery system to the external power source when the battery state of charge is higher than a first threshold level, and (ii) prevent the power flow from the rechargeable battery system to the external power source when the battery state of charge is lower than a second threshold level.

Aspect 8 is the electrically powered portable self-contained climate controlled storage unit of any one of aspects 1-7, wherein the controller is configured to determine whether to supply energy from the power source to the climate control system based on the one or more power sharing parameters.

Aspect 9 is the electrically powered portable self-contained climate controlled storage unit of aspect 8, wherein the one or more power sharing parameters include a battery state of charge of the rechargeable battery system, and
wherein the controller is configured to determine the battery state of charge of the rechargeable battery system, and indicate that the rechargeable battery system is to supply power to the climate control system when the battery state of charge is higher than a threshold level.

Aspect 10 is the electrically powered portable self-contained climate controlled storage unit of any one of aspects 1-9, further comprising a user interface configured to receive a user's input indicating whether to direct power flow to or from the rechargeable battery system for the predetermined period of time.

Aspect 11 is the electrically powered portable self-contained climate controlled storage unit of aspect 10, wherein the user interface is configured to receive the user's input indicating that the storage unit is in a standby mode to wait for the determination from the controller.

Aspect 12 is a method of coordinating charging of a plurality of electrically powered portable self-contained climate controlled storage units to be connected to an external power source, each storage unit comprising a climate control system configured to provide climate control to an internal climate controlled space, and a power source to supply power to the climate control system, the power source including a rechargeable battery system, the method comprising:
- a controller pairing the plurality of storage units to form a group;
- the controller communicating to update an individual status for each storage unit among the group;
- the controller determining a charge priority for each storage unit of the group based on the updated individual status; and
- the controller instructing to charge, via the external power source, the plurality of storage units based on the determined charge priority.

Aspect 13 is the method of aspect 12, wherein the controller pairing the plurality of storage units further comprises the controller determining whether each of the plurality of storage units are stationary for a predetermined period of time, the controller identifying whether the plurality of storage units is in close proximity with respect to each other, and the controller determining whether the plurality of storage units is connected to one or more outlets of the external power source.

Aspect 14 is the method of aspect 12 or 13, further comprising the controller receiving a feedback from the external power source upon an input from one or more of the plurality of storage units, and determining whether the plurality of storage units is connected to the same external power source based the received feedback.

Aspect 15 is the method of any one of aspects 12-14, further comprising the controller monitoring one or more characteristic parameters of the external power source.

Aspect 16 is the method of any one of aspects 12-15, wherein the controller pairing the plurality of storage units further comprises the controller instructing the plurality of storage units to exchange a signal to regulate data transfer therebetween.

Aspect 17 is the method of any one of aspects 12-16, wherein the controller pairing the plurality of storage units further comprises the controller receiving an identification of each of the plurality of storage units.

Aspect 18 is the method of any one of aspects 12-17, further comprising the controller preventing simultaneous startup of charging two or more of the plurality of storage units when the two or more storage units are connected to the external power source.

Aspect 19 is the method of any one of aspects 12-18, wherein the controller determining the charge priority comprises the controller determining a battery state of charge and an electrical load of each storage unit of the group.

Aspect 20 is the method of any one of aspects 12-19, wherein the controller instructing to charge the plurality of storage units further comprises the controller instructing to sequentially charge the plurality of storage units automatically.

Aspect 21 is a coordinated control system comprising:
- a plurality of electrically powered portable self-contained climate controlled storage units to be connected to an external power source, each storage unit comprising an internal climate controlled space, a climate control system configured to provide climate control to the internal climate controlled space, and a power source configured to supply power to the climate control system, the power source including a rechargeable battery system; and
- a controller configured to:
  - pair the plurality of storage units to form a group;
  - communicate to update an individual status for each storage unit among the group;
  - determine a charge priority for each storage unit of the group based on the updated individual status; and
  - instruct to charge, via the external power source, the plurality of storage units of the group based on the determined charge priority.

Aspect 22 is the system of aspect 21, wherein the controller is further configured to determine whether each of the plurality of storage units are stationary for a predetermined period of time, the controller identifying whether the plurality of storage units is in close proximity with respect to each other, and the controller determining whether the plurality of storage units is connected to the external power source.

Aspect 23 is the system of aspect 21 or 22, wherein the controller is further configured to instruct each storage unit to exchange a signal to regulate data transfer therebetween.

Aspect 24 is the system of any one of aspects 21-23, wherein the controller is further configured to receive an identification of each of the plurality of storage units.

Aspect 25 is the system of any one of aspects 21-24, wherein the controller is further configured to prevent simultaneous startup of charging two or more of the plurality of storage units when the two or more storage units are connected to the external power source.

Aspect 26 is the system of any one of aspects 21-25, wherein the controller is further configured to determine a battery state of charge and an electrical load of each storage unit of the group.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. An electrically powered portable self-contained climate controlled storage unit, comprising:
   a base comprising an enclosure;

a climate controlled space affixed to the base;

a climate control system at least partially received in the enclosure, and configured to provide climate control to the climate controlled space, a power source configured to supply power to the climate control system, the power source including a rechargeable battery system received in the enclosure;

a power circuit component connected to the rechargeable battery system, the power circuit component configured to direct power flow to or from the rechargeable battery system; and a controller configured to obtain one or more power sharing parameters and configured to determine whether to direct power flow to or from the rechargeable battery system for a predetermined period of time based on the one or more power sharing parameters.

2. The electrically powered portable self-contained climate controlled storage unit of claim 1, wherein the power circuit component is configured to connect the rechargeable battery system to an external power source and direct a bi-directional power flow therebetween.

3. The electrically powered portable self-contained climate controlled storage unit of claim 2, wherein the controller is configured to determine whether to direct power flow from the external power source to the rechargeable battery system to charge the rechargeable battery system based on the one or more power sharing parameters.

4. The electrically powered portable self-contained climate controlled storage unit of claim 3, wherein the one or more power sharing parameters include a utility charge rate, and wherein the controller is configured to determine the utility charge rate on the external power source, and (i) direct the power flow from the external power source to the rechargeable battery system when the utility charge rate is lower than a first threshold utility charge rate, and (ii) prevent the power flow from the external power source to the rechargeable battery system when the utility charge rate is higher than a second threshold utility charge rate.

5. The electrically powered portable self-contained climate controlled storage unit of claim 2, wherein the controller is configured to determine whether to direct power from the rechargeable battery system to the external power source based on the one or more power sharing parameters.

6. The electrically powered portable self-contained climate controlled storage unit of claim 5, wherein the one or more power sharing parameters include a utility charge rate, and wherein the controller is configured to determine the utility charge rate on the external power source, and (i) direct the power flow from the rechargeable battery system to the external power source when the utility charge rate is higher than a first threshold utility charge rate, and (ii) prevent the power flow from the rechargeable battery system to the external power source when the utility charge rate is lower than a second threshold utility charge rate.

7. The electrically powered portable self-contained climate controlled storage unit of claim 5, wherein one or more power sharing parameters include a battery state of charge of the rechargeable battery system, and wherein the controller is configured to determine the battery state of charge of the rechargeable battery system, and (i) direct the power flow from the rechargeable battery system to the external power source when the battery state of charge is higher than a first threshold level, and (ii) prevent the power flow from the rechargeable battery system to the external power source when the battery state of charge is lower than a second threshold level.

8. The electrically powered portable self-contained climate controlled storage unit of claim 1, wherein the controller is configured to determine whether to supply energy from the power source to the climate control system based on the one or more power sharing parameters.

9. The electrically powered portable self-contained climate controlled storage unit of claim 8, wherein the one or more power sharing parameters include a battery state of charge of the rechargeable battery system, and wherein the controller is configured to determine the battery state of charge of the rechargeable battery system, and instruct the rechargeable battery system to supply power to the climate control system when the battery state of charge is higher than a threshold level.

10. The electrically powered portable self-contained climate controlled storage unit of claim 1, further comprising a user interface configured to receive a user's input indicating whether to direct power flow to or from the rechargeable battery system for the predetermined period of time.

11. The electrically powered portable self-contained climate controlled storage unit of claim 10, wherein the user interface is configured to receive the user's input indicating that the storage unit is in a standby mode to wait for the determination from the controller.

12. A method of coordinating charging of a plurality of electrically powered portable self-contained climate controlled storage units to be connected to an external power source, each storage unit comprising a climate control system configured to provide climate control to an internal climate controlled space, and a power source to supply power to the climate control system, the power source including a rechargeable battery system, the method comprising:

a controller pairing the plurality of storage units to form a group;

the controller communicating to update an individual status for each storage unit among the group;

the controller determining a charge priority for each storage unit of the group based on the updated individual status; and the controller instructing to charge, via the external power source, the plurality of storage units based on the determined charge priority.

13. The method of claim 12, wherein the controller pairing the plurality of storage units further comprises the controller determining whether each of the plurality of storage units are stationary for a predetermined period of time, the controller identifying whether the plurality of storage units is in close proximity with respect to each other, and the controller determining whether the plurality of storage units is connected to one or more outlets of the external power source.

14. The method of claim 12, further comprising the controller receiving a feedback from the external power source upon an input from one or more of the plurality of storage units, and determining whether the plurality of storage units is connected to the same external power source based the received feedback.

15. The method of claim 12, further comprising the controller monitoring one or more characteristic parameters of the external power source.

16. The method of claim 12, wherein the controller pairing the plurality of storage units further comprises the controller instructing the plurality of storage units to exchange a signal to regulate data transfer therebetween.

17. The method of claim 12, wherein the controller pairing the plurality of storage units further comprises the controller receiving an identification of each of the plurality of storage units.

18. The method of claim 12, further comprising the controller preventing simultaneous startup of charging two or more of the plurality of storage units when the two or more storage units are connected to the external power source.

19. The method of claim 12, wherein the controller determining the charge priority comprises the controller determining a battery state of charge and an electrical load of each storage unit of the group.

20. The method of claim 12, wherein the controller instructing to charge the plurality of storage units further comprises the controller instructing to sequentially charge the plurality of storage units automatically.

* * * * *